United States Patent [19]
Christy

[11] 3,768,331
[45] Oct. 30, 1973

[54] MICROMANIPULATOR UTILIZING A CONSTANT VELOCITY UNIVERSAL JOINT

[75] Inventor: Harold Lindsay Christy, Phoenix, Ariz.

[73] Assignee: Motorola, Inc., Franklin Park, Ill.

[22] Filed: Nov. 17, 1972

[21] Appl. No.: 307,757

[52] U.S. Cl. .................................. 74/491, 269/58
[51] Int. Cl. ............................................. G05g 1/00
[58] Field of Search ............... 74/471 XY, 471, 491, 74/469; 351/38; 269/58

[56] References Cited
UNITED STATES PATENTS
3,463,579  8/1969  Papritz ........................ 74/471 XY
3,504,566  4/1970  Zurcher ............................ 74/469

*Primary Examiner*—Milton Kaufman
*Attorney*—Vincent J. Rauner et al.

[57] ABSTRACT

A precision alignment fixture which linearly translates lateral and angular motion of a single control member to a rotatable transfer shaft. A main spherical bearing has a cylindrical hole therein, and a bushing having a flange is fitted within the hole. A spherical pivot bearing having a mounting shaft affixed thereto is captured within the bushing by the flange and by a control member shaft also fitted within said bushing. The main spherical bearing pivots on the firmly mounted pivot bearing and fits snugly within a second bushing so that a swiveling motion of the control member is directly transmitted by the second bushing to a housing member which supports a rotatable transfer shaft and associated mounting bearings. The control member is directly coupled from the main spherical bearing to the second bushing by pins affixed to the main spherical bearing and extending into the second bushing, which engages a first sprocket, coupled by a chain to a second large sprocket on the same shaft as a small third sprocket, which is coupled by a chain to a large fourth sprocket attached to the transfer shaft. A centralizer mechanism which includes a scissors-like apparatus having an aligned groove in each blade thereof may be actuated by an attached air cylinder apparatus so that the aligned grooves close upon the transfer shaft.

9 Claims, 4 Drawing Figures

MICROMANIPULATOR UTILIZING A CONSTANT VELOCITY UNIVERSAL JOINT

BACKGROUND OF THE INVENTION

This invention relates to mechanical translation apparatus and more particularly to work positioning devices for use in manufacturing apparatus designed for microsize workpieces, such as semiconductor dice.

In manufacturing apparatus, the alignment of a work tool with a workpiece located on a work table usually consists of two steps. The first step includes positioning the workpiece in the general area of the work tool. This placement may be accomplished by several means including hand loading or by movement of a belt or other automatic or semiautomatic carrier holding a plurality of workpieces (for example, semiconductor dice). After placing the workpiece in the work station, the second step causes the work tool and workpiece to be moved within the work station from a non-working to a working position. In semiconductor manufacture this latter positioning may consist of movements of only thousandths of an inch, and includes both lateral and rotational translation of the workpiece to a precise position.

To reduce manufacturing costs, it is desired that positioning of the workpiece be performed accurately and quickly by either an operator or by a suitably programmed computer or numerical machine. Some previous manipulators accomplish accurate linear translations of a working piece and are suitable for control by a numerical machine, but require a second control member to control angular translation of the workpiece. Other prior manipulators achieve both lateral and angular translation of the workpiece by a single control member, but suffer from the deficiency that rotational translation is imparted to the pulley or gear arrangement driving the workpiece by a resilent sleeve system which depends upon friction for translation of motion. Some cumulative slippage is unavoidable in this system and consequently such systems are not suitable for control by numerical machines since it is difficult to accurately program the numerical machine to account for the slippage.

The present invention solves these shortcomings of the prior art by providing a precision micromanipulator in which a single control member provides, with adjustable lateral mechanical advantage, linear, playless, lateral and rotational movement to a rotatable transfer shaft upon which a suitable platform for receiving a workpiece may be mounted.

SUMMARY OF THE INVENTION

In view of the foregoing, an object of this invention is to provide a precision alignment device having a rotatable transfer shaft to which lateral X-Y displacement and also angular displacement may be imparted by a single control member.

It is a further object of this invention to provide a precision alignment device of the type described which is suitable for control by an operator or by a programmed numerical machine.

It is a further object of this invention to provide a precision alignment device of the type described having a constant velocity captured ball type universal joint which provides all movement without slippage due to friction.

It is still a further object of this invention to provide a precision alignment device of the type described in which the initial cartesian position of the transfer shaft may be established by a scissors type centralizing mechanism.

Yet a further object of the invention is to provide a precision alignment device having adjustable mechanical advantage.

Briefly described, the invention is a precision alignment fixture which linearly translates lateral and angular motion of a single control member to a rotatable transfer shaft. A main spherical bearing has a cylindrical hole therein, and a bushing having a flange is fitted within the hole. A spherical pivot bearing having a mounting shaft affixed thereto is captured within the bushing by the flange and by a control member shaft also fitted within said bushing. The main spherical bearing pivots on the firmly mounted pivot bearing and fits snugly within a second bushing so that a swiveling motion of the control member about the spherical pivot bearing is directly transmitted by the second bushing to a housing member which supports a rotatable transfer shaft and associated mounting bearings. The mechanical advantage of the mechanism is adjustable by sliding the bushing having the pivot bearing captured therein along said hole and the main spherical bearing. The housing member is held non-rotatable by a system of three slide plates. Angular motion of the control member is directly coupled from the main spherical bearing to the second bushing by pins affixed to the main spherical bearing and extending into the second bushing, which engages a first sprocket, coupled by a chain to a second large sprocket on the same shaft as a small third sprocket, which is coupled by a chain to a large fourth sprocket attached to the transfer shaft. A centralizer mechanism which includes a scissors-like apparatus having an aligned groove in each blade thereof may be actuated by an attached air cylinder apparatus so that the aligned grooves close upon the transfer shaft, thereby constraining it both to a fixed initial angular coordinate position, and also to fixed initial X-Y coordinate position.

DETAILED DESCRIPTION OF THE INVENTION

Figure 1:
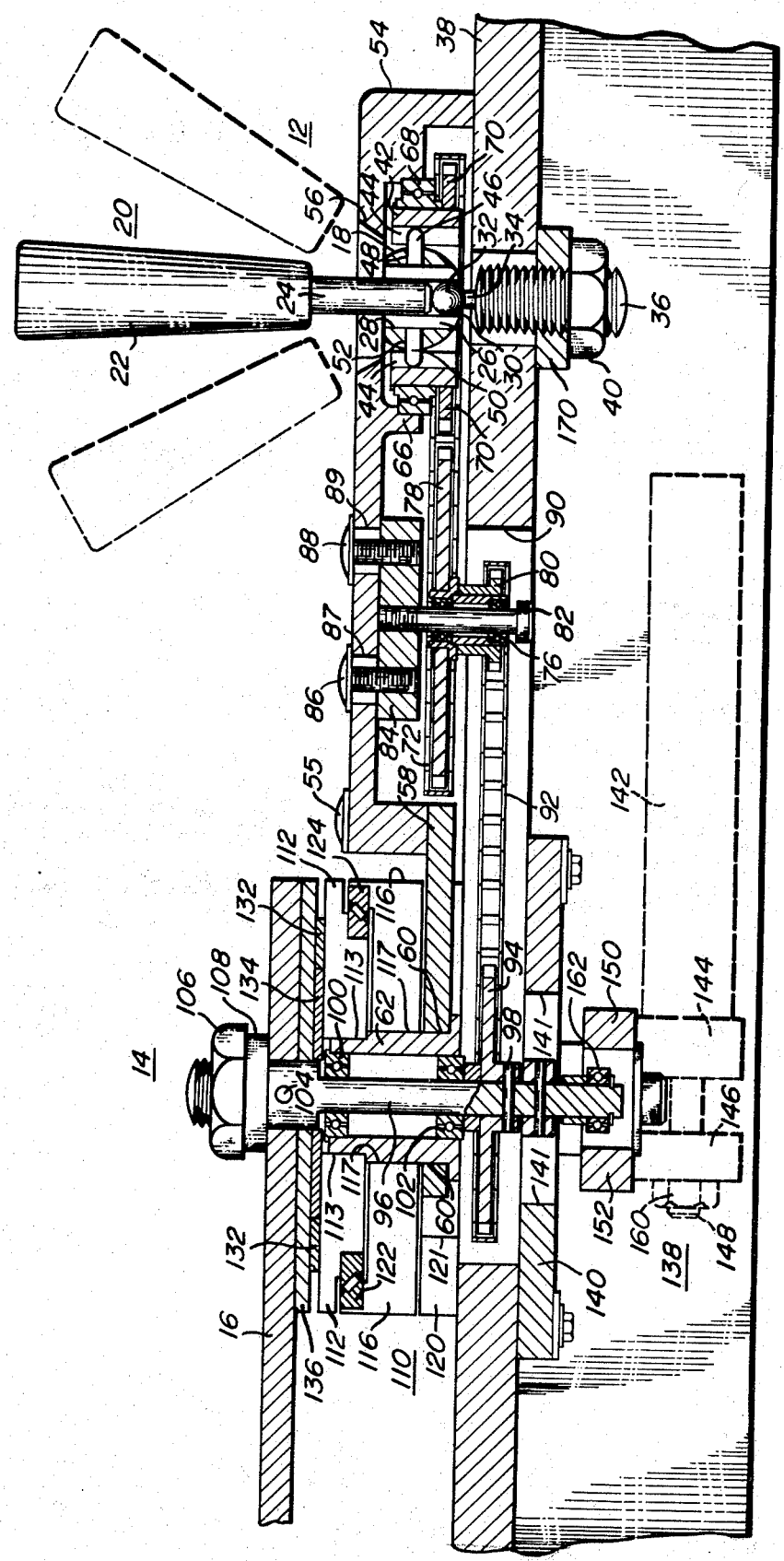
FIG. 1 is a cross section of an embodiment of the invention along the line 1—1 of FIG. 2.
Figure 2:
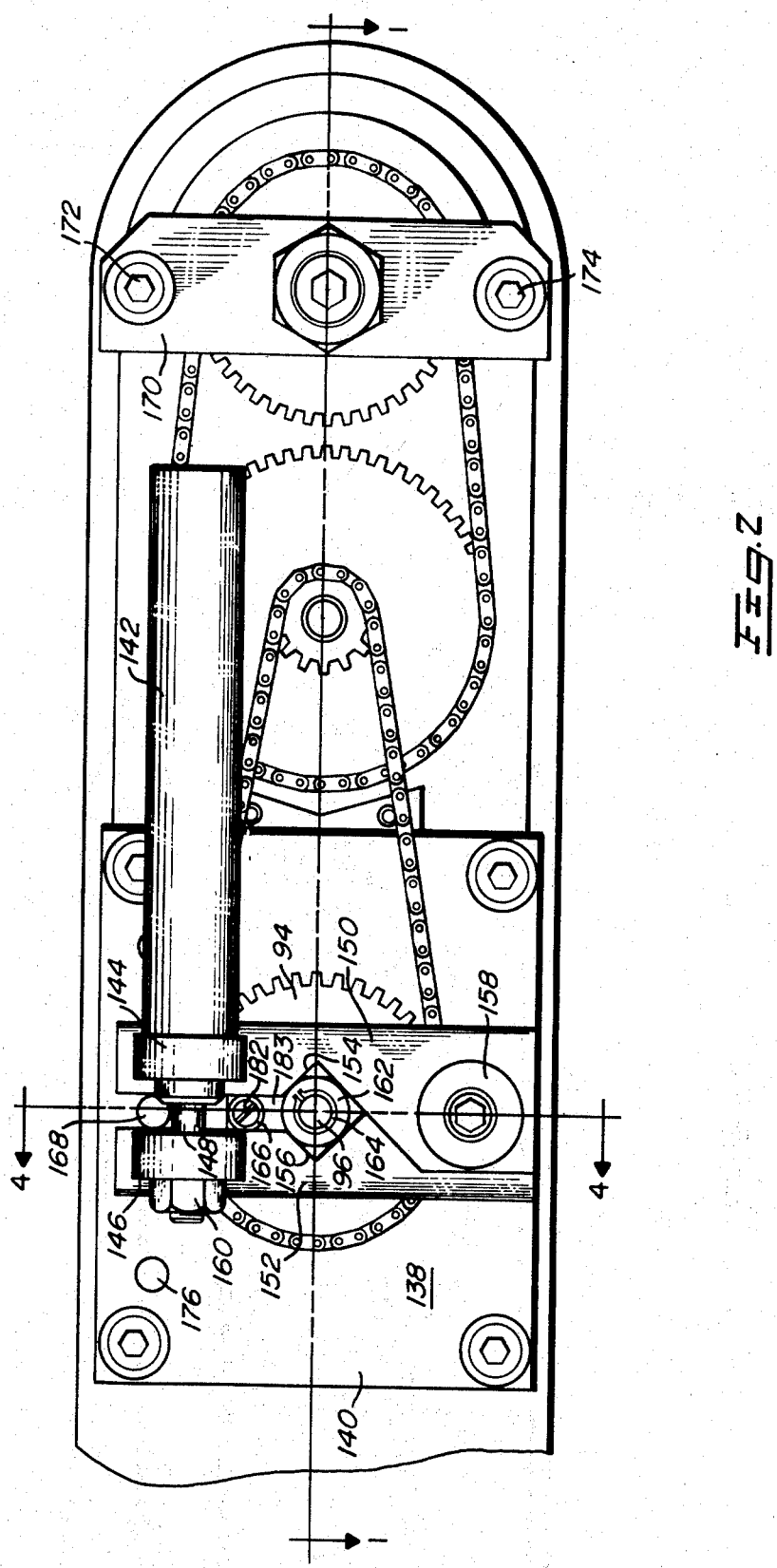
FIG. 2 is a bottom view of the embodiment of the invention.

FIG. 1 shows the micromanipulator 10 comprising a constant velocity universal joint mechanism 12 which controls the X-Y lateral displacement and also the angular displacement of a rotatable transfer shaft assembly 14 and a deck 16 firmly attached thereto. A work station and workpiece (not shown) are mounted thereon. The constant velocity universal joint 12 includes a main shperical bearing 18 connected to a control member 20 having a handle 22 attached to a shaft 24 which fits snugly within a tubular bushing 26. Tubular bushing 26 fits snugly, but slidably within a hole 28 diametrically disposed through main spherical bearing 18, and at one end has a retaining flange 30, which retains a spherical pivot bearing 32 snugly but movably within tubular bushing 26. Spherical pivot bearing 32 is also retained within tubular bushing 26 by the cylindrical walls thereof and also by the end of shaft 24. Spherical pivot bearing 32 is firmly attached to a shaft 34 of sufficiently small diameter to extend through retaining flange 30 and permits suitable swiveling or pivoting of the constant velocity ball joint assembly 12 about spherical pivot bearing 32. Retaining flange 30 may be integral with main spherical bearing 18, or may be pressed thereon, or main spherical bearing may be threaded to accommodate retaining flange 30, which may be screwed thereon to closely accommodate spherical pivot bearing 32. Shaft 34 is firmly attached to larger threaded shaft 36, which is screwed into support cross plate 170, which is fastened to base plate 38 by hex screws 172 and 174 as shown in FIG. 2. The threaded portion 36 of shaft 34 which is attached to spherical pivot bearing 32 is mounted on support cross plate 170 and tightened in place by hex nut 40. Main spherical bearing 18 fits snugly but movably within grooved tubular bushing 42, which has two diametrically opposite grooves parallel to the cylindrical axis of grooved tubular bushing 42, so that when control member 20 is displaced so as to pivot constant velocity ball joint assembly 12 about spherical pivot bearing 32, an X-Y lateral displacement is imparted to grooved tubular bushing 42. A first dowel 46 fits firmly within a first hole 48 diametrically disposed through main spherical bearing 18 and is perpendicular to hole 28, and a second dowel 50 fits firmly within a second hole 52 diametrically disposed within main spherical bearing 18 perpendicularly to hole 28 and diametrically opposite to first hole 48. Dowels 46 and 50 are movably but snugly accommodated within grooves 44, so that rotational displacement imparted to constant velocity ball joint assembly 12 by control member 20 is directly imparted to grooved tubular bushing 42. The foregoing elements comprise the complete constant velocity universal joint assembly 12.

It may be seen that the constant velocity universal joint assembly 12 provides the capability of translating lateral motion of the handle 22 into a precise corresponding motion of an external member connected to the universal joint at a predetermined mechanical advantage. Placement of the small pivot bearing 32 inside large main bearing 18 provides an exceptionally compact mechanism compared to those of the prior art. When handle 22 is rotated the dowels 48 and 50, which fit movably in the grooves 44, translate the rotational displacement directly to an external member connected to the constant velocity universal joint assembly 12. It should be appreciated that the handle 22 of the control member 20 may be replaced by any suitable playless coupling mechanism for coupling the constant velocity ball joint assembly to a programmable numerical machine or to a computer.

An assembly external to the constant velocity universal joint assembly 12 is now described which permits rotational and lateral movements, respectively, of handle 22 to be transmitted, each at a predetermined mechanical advantage, to a workpiece which must be precisely aligned prior to performing an operation thereon. Housing member 54 is included in this assembly. Housing member 54 slides on the upper surface of base plate 38, and has a hole 56 therein to accommodate a suitable swiveling action of control member 20. Housing member 54 shelters the constant velocity ball joint assembly 12 (except for control member 20) and is connected at one end to transfer arm member 58, which has an opening 60 therein, into which flanged tubular member 62 is press fit. The lower surface of flanged tubular member 62 also slides on the upper surface of base plate 38.

The housing member 54 is connected to the constant velocity universal joint assembly 12 by means of a cylindrical extension within housing member 54. Cylindrical extension 66 of housing member 54 on the inside portion thereof is press fitted around ball bearing assembly 68, which is press fitted onto grooved tubular bushing 42, so that swiveling motion of control member 20 results in a linear X-Y displacement of housing member 54, which slides in a single plane along the surface of base plate 38, the mechanical advantage being determined by the relative vertical position of the centers of spherical pivot bearing 32 and main spherical bearing 18.

Rotational movement of handle 22 is transmitted from constant velocity universal joint assembly 12 to a work station by means of a chain and sprocket assembly including the following elements. Sprocket 70 is rigidly fixed to grooved tubular bushing 42 and is directly coupled by chain 72 to second sprocket 78 which is attached to the inside portion of housing member 54 by means of second ball bearing assembly 76 attached to second sprocket 78 which is coaxially attached to third sprocket 80, second ball bearing assembly 76 being rotatably mounted on partially threaded shaft 82 which is screwed into slidable sprocket mounting block 84. Slidable sprocket mounting block 84 is firmly fixed to the inside surface of housing member 54 by hex screws 86 and 88. Slidable sprocket mounting block 84 may be adjusted to take the slack out of chain 78 by loosening hex screws 86 and 88, which fit adjustably through enlarged holes 87 and 89, respectively, in housing member 54. Hex screws 86 and 88 may be tightened after sprocket mounting block 84 is slid to tighten chain 72. Similarly, hex screws 55 and 57 also fit adjustably through elongated holes (not shown) in housing member 54 and screw into a threaded portion of transfer arm member 58, and may be loosened sufficiently to slide transfer arm 58 enough to take the slack out of chain 92. Screws 55 and 57 may then be retightened. Thus, a completely slackless rotational drive operation is obtained between control member 20 and rotatable transfer shaft 96.

The rotational motion of handle 22 is ultimately transmitted to the workpiece by means of a work station (not shown) mounted on a rotatable shaft or on a deck mounted on the rotatable shaft which in turn is mounted on a member firmly attached to housing member 54. Rotational motion is transmitted from the constant velocity universal joint assembly 12 to the rotatable shaft by means of chains and sprockets, and lateral movement is transmitted from the constant velocity universal joint assembly 12 to the rotatable shaft by means of the housing member 54 upon which the rotatable shaft 96 is mounted. Second chain 92 couples sprocket 80 to sprocket 94, which is attached to rotatable transfer shaft 96 by means of a driver pin 98 therethrough. Rotatable transfer shaft 96 is accommodated by a bearing assembly 100 which is fitted within flanged tubular member 62 and also by bearing assembly 102 which is also fitted within flanged tubular member 62. Deck 16 is firmly mounted on rotatable transfer shaft 96 by means of driver pin 104 and by hex nut 106 which is screwed onto the threaded end of rotatable transfer shaft 96. Since deck 16 may be made of a relatively soft material, such as aluminum, hardened washer 108 is used to prevent damage caused by hex nut 106.

The entire housing assembly and the apparatus affixed thereto are held non-rotatable with respect to base plate 38 by the action of slide plate assembly 110, which is mounted on base plate 38. The top slide plate 112, middle slide plate 116, and the bottom slide plate 120 are rectangular. Top slide plate 112 has centered therein a round hole 113 and is press fit onto flanged tubular member 62. Middle slide plate 116 has a larger round clearance hole 117 to allow suitable lateral movement thereof with respect to rotatable transfer shaft 96, and slides along top slide plate 112 in a direction perpendicular to the cross sectional view shown in FIG. 1 by virtue of linear bearing assemblies 122 and 124. Bottom slide plate 120 is firmly fixed to base plate 38, and also has a large rounded clearance cut 121 to accommodate lateral movement of transfer member 58. Linear bearing assemblies 126 and 128 permit middle slide plate 116 to slide with respect to bottom slide plate 120 in a direction perpendicular to the cross sectional view shown in FIG. 4 (and parallel to the sliding direction permitted with respect to top slide plate 112). Thrust bearing assembly 132 comprises a circular cage with needles or rollers placed diametrically within the cage plate and the opposite plate or member with their axis along radii of the cage plate. A circular bearing spacer 134 has a hole therein to accommodate rotatable transfer shaft 96 and abuts bearing assembly 132, which rests upon top slide plate 112. A hardened thrust washer 136 having a hole therein to accommodate rotatable transfer shaft 96 rests upon thrust bearing assembly 132 and protects deck 16 from damage thereto.

After the desired operation requiring the precision alignment has been performed and the workpiece has been removed, it is desirable to initialize the position, both laterally and angularly, of the work station (not shown) and slide deck 16 prior to loading another workpiece on the work station. This function is accomplished according to the present invention by an automatic centralizing system. Automatic centralizing assembly 138 is mounted on a support bracket 140 having an opening 141 therein affixed to base plate 38, and comprises air cylinder assembly 142 which has a mounting collar 144 and also a threaded pivot collar 146 which is screwed onto air cylinder shaft 148. Mounting collar 144 and threaded pivot collar 146 are affixed, respectively, to scissors-like members 150 and 152, which respectively have "V" grooves 154 and 156 on one edge thereof, as is seen by referring to FIG. 2. Members 150 and 152 are movably fastened to base plate 38 by means of pivot pin 158. When the scissor blades are opened, transfer shaft 96 is free to move as control member 20 is displaced, and when the air cylinder 142 is actuated, mounting collar and pivot collar 144 and 146 are pulled together by virtue of hex nut 160 on the threaded end of shaft 148, thereby pulling members 150 and 152 together so that "V" grooves 154 and 156 close upon a bearing assembly 162, which is mounted on rotatable transfer shaft 96. Bearing assembly 162 is retained on transfer shaft 96 by retaining pin 164. Thus, the X-Y coordinates of transfer shaft 96 and the work station (not shown) mounted on deck 16 are initialized when air cylinder 142 is actuated.

The angular position of rotatable transfer shaft 96 is also initialized when air cylinder 142 is actuated by virtue of outboard bearing 166. Registration pin 168 determines the final closed position of members 150 and 152 when the air cylinder is actuated. Registration pin 168 is affixed to mounting block 140. A second registration pin 176 determines the position of scissor blades 150 and 152 when air cylinder 142 is not actuated.

Figure 4:
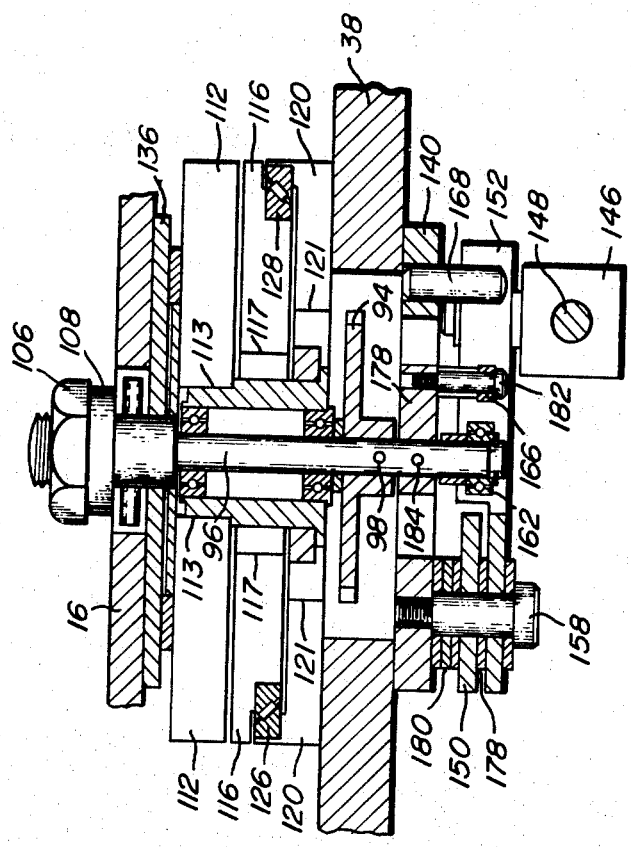
FIG. 4 is a cross sectional view of the embodiment of the invention along the line 4—4 of FIG. 2.

Referring to FIG. 4, additional features of the automatic centralizing system 138 are seen. Members 150 and 152 are isolated from each other at pivot pin 158 by teflon washers 178 and 180. Outboard bearing 166 is fastened to rotatable transfer shaft 98 by means of a screw 182 having its threaded end screwed into outboard mounting arm 183, which has a hole accommodating rotatable transfer shaft 98 and is affixed thereto by a driver pin (not shown).

Figure 3:
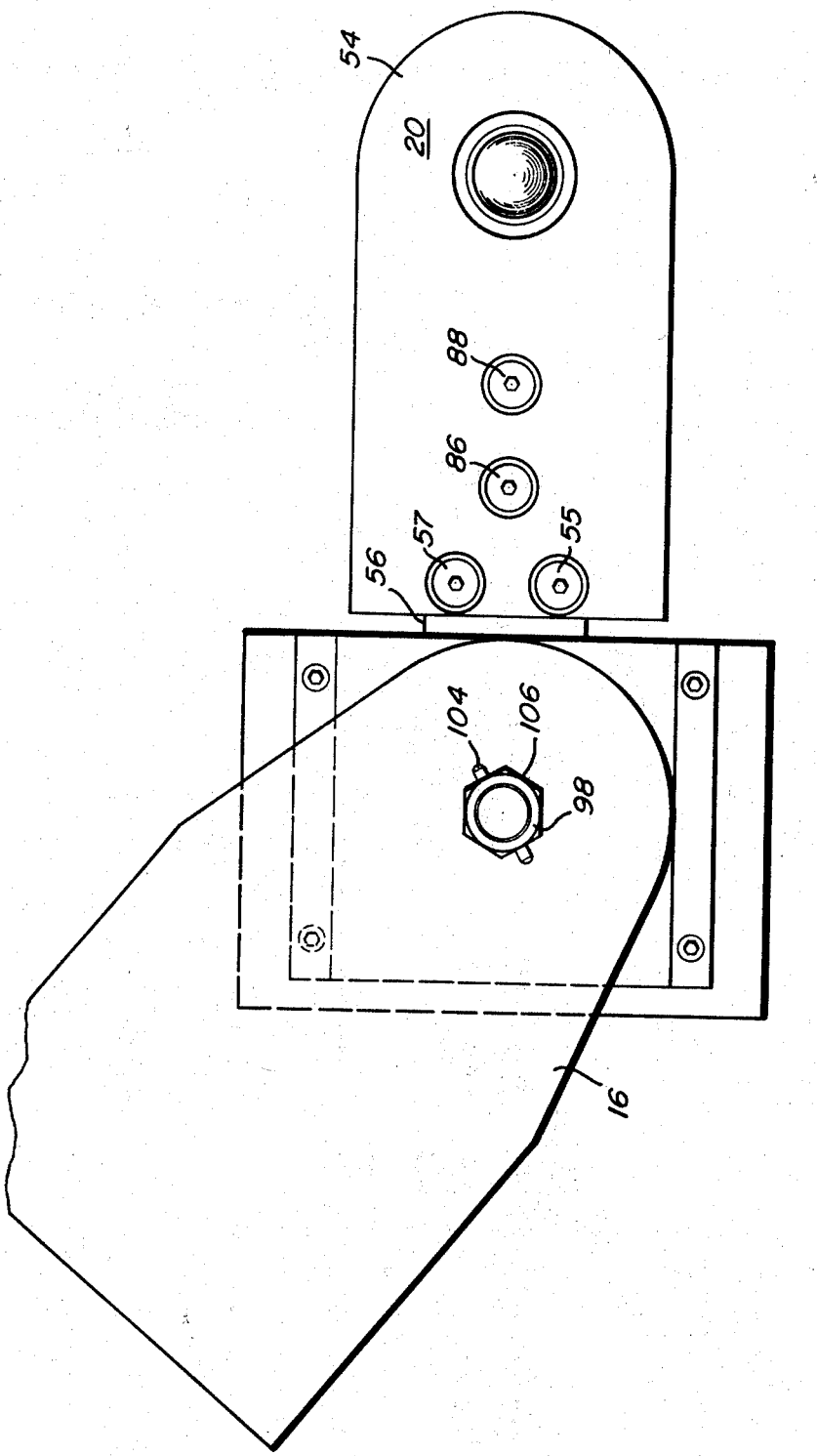
FIG. 3 is a top view of a portion of the invention.

In the top view, shown in FIG. 3, several additional features of the micromanipulator 10 are more clearly depicted. Deck 16 is shown to have a large area upon which ultrasonic transducer lead bonding apparatus or other useful apparatus may be mounted. The microsize workpiece is normally loaded on a work station (not shown) directly over the axis of rotatable transfer shaft 98. The slots in deck 16 accommodate driver pin 104, and hex nut 106 securely fastens deck 16 to rotatable transfer shaft 98. The work station may be firmly attached to transfer shaft 92 or slide deck 16. Screws 55 and 57 securely fasten first transfer arm member 58 to housing 54.

In summary, a unique constant velocity universal joint embodied within a unique micromanipulator system has been described, wherein precision lateral and angular displacement are playlessly translated from a single control member to a work station.

While the invention has been shown in connection with a certain specific example, it will be readily apparent to those skilled in the art that various changes in form and arrangement of parts may be made to suit the requirement without departing from the spirit and scope of this invention.

What is claimed is:

1. A constant velocity universal joint apparatus comprising:
   a main spherical bearing having a hole therein, and connected to a control member, so that the control member is for receiving rotational and lateral displacement from an external source;
   a spherical pivot bearing having mounting means connected thereto for providing an adjustable pivot reference point for the constant velocity universal joint apparatus;
   adjustable means disposed within said hole and capturing the spherical pivot bearing for permitting pivoting and rotational displacement of the main spherical bearing thereon, and permitting adjustment of the mechanical advantage of the constant velocity universal joint, and;
   coupling means for movably accommodating the main spherical bearing therein for playlessly coupling lateral and rotational displacement of the main spherical bearing to an external member.

2. The constant velocity universal joint apparatus of claim 1 wherein:

the hole in the main spherical bearing is diametrically disposed therein;

the adjustable means include a tubular bushing adjustably fitting within said hole, the tubular bushing having the spherical pivot bearing swivelably fitting therein, and retained therein by a retaining flange on one end of the tubular bushing and also by a shaft of the control member, the shaft being press fitted into the other end of the tubular bushing.

3. The constant velocity universal joint apparatus of claim 1 wherein:

the coupling means include a grooved tubular bushing having at least one groove disposed along an inner wall thereof parallel to a cylindrical axis thereof;

the main spherical bearing fits movably within the grooved tubular bushing and has at least one appendage thereon which fits accurately within said groove for imparting rotational displacement of the main spherical bearing to the grooved tubular bushing, whereby lateral and rotational displacement of the main spherical bearing are accurately imparted to the grooved tubular bushing, and;

the grooved tubular bearing has means thereon for coupling lateral and rotational displacement thereof to an external member.

4. A micromanipulator comprising:

a base plate member having mounted thereon a movable housing member and a slide plate assembly including a first slide plate member, the movable housing member having attached thereto a transfer member operatively connected to the slide plate assembly for allowing lateral displacement of the first slide plate member and the movable housing member while simultaneously preventing rotational displacement thereof;

an assembly including a rotatable transfer shaft having means thereon for attaching a work station and apparatus, the assembly being mounted on the first slide plate member, whereby the work station may undergo both lateral and rotational displacement;

a constant velocity universal joint apparatus comprising:

a main spherical bearing having a hole therein, and connected to a control member, wherein the control member is for receiving rotational and lateral displacement from an external source;

a spherical pivot bearing having mounting means connected thereto for providing an adjustable pivot reference point for the constant velocity universal joint apparatus;

adjustable means disposed within said hole and capturing the spherical pivot bearing for permitting pivoting and rotational displacement of the main spherical bearing thereon, and permitting adjustment of the mechanical advantage of the constant velocity universal joint, and;

coupling means for movably accommodating the main spherical bearing therein for playlessly coupling lateral and rotational displacement of the main spherical bearing to the movable housing member, and;

driving means for playlessly coupling rotational displacement of the coupling means to the rotatable transfer shaft.

5. The micromanipulator of claim 4 further including centralizing means for initializing the position of the rotatable transfer shaft.

6. The micromanipulator of claim 5 wherein the centralizing means comprise two scissors-like blade members each having a V-groove on an inside edge thereof, an actuating device coupled to the two scissors-like blade members, at least one pivot pin for mounting the scissors-like blade members, an outboard bearing operatively connected to the rotatable transfer shaft, whereby when the actuating device closes the two scissors-like blade members to a fixed position, the V-grooves constrain the rotatable transfer shaft to a fixed lateral position and the inside edges constrain the outboard bearing to a fixed position, thereby constraining the rotatable transfer shaft to a fixed initial angular position.

7. The micromanipulator of claim 4 wherein the driving means include at least two sprockets and at least one chain, one sprocket attached to the coupling means of the constant velocity universal joint apparatus and one sprocket attached to the rotatable transfer shaft, the chain playlessly coupling the sprockets.

8. The micromanipulator of claim 7 wherein said transfer member has adjustable means connecting the transfer member to the movable housing member for allowing adjustment of the tension of the chain.

9. The micromanipulator of claim 4 wherein the mounting means of the spherical pivot bearing are mounted on an adjustable support member, wherein the adjustable support member may be adjusted to provide a desired position of the control member corresponding to a certain position of the rotatable transfer shaft.

* * * * *